Dec. 15, 1964 L. V. ROBIN 3,161,407
VIBRATION AND SHOCK ABSORBER
Filed July 11, 1962 3 Sheets-Sheet 1
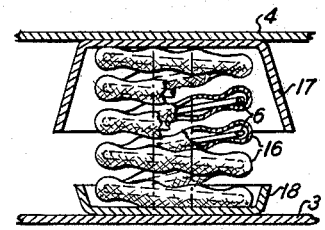
Fig. 1
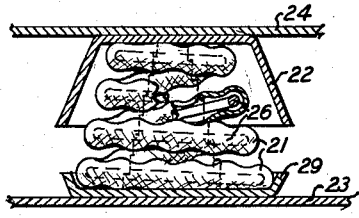
Fig. 2
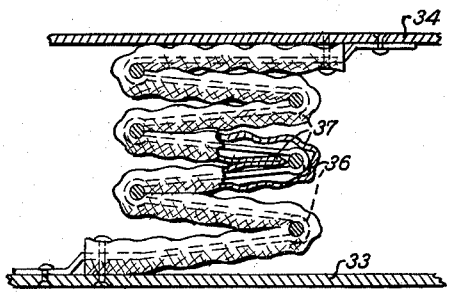
Fig. 3
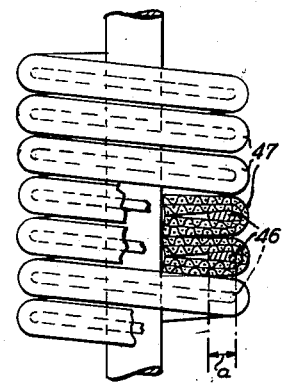
Fig. 4
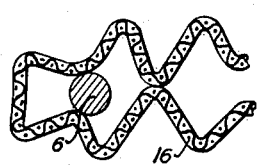
Fig. 5
Fig. 7
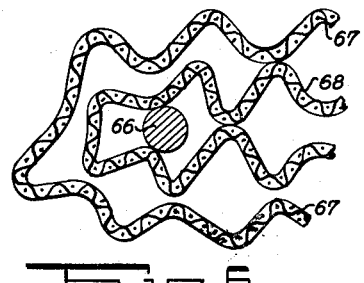
Fig. 6
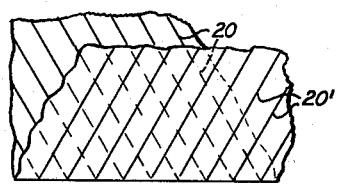
Fig. 8
INVENTOR
LEO VICTOR ROBIN

INVENTOR
LEO VICTOR ROBIN

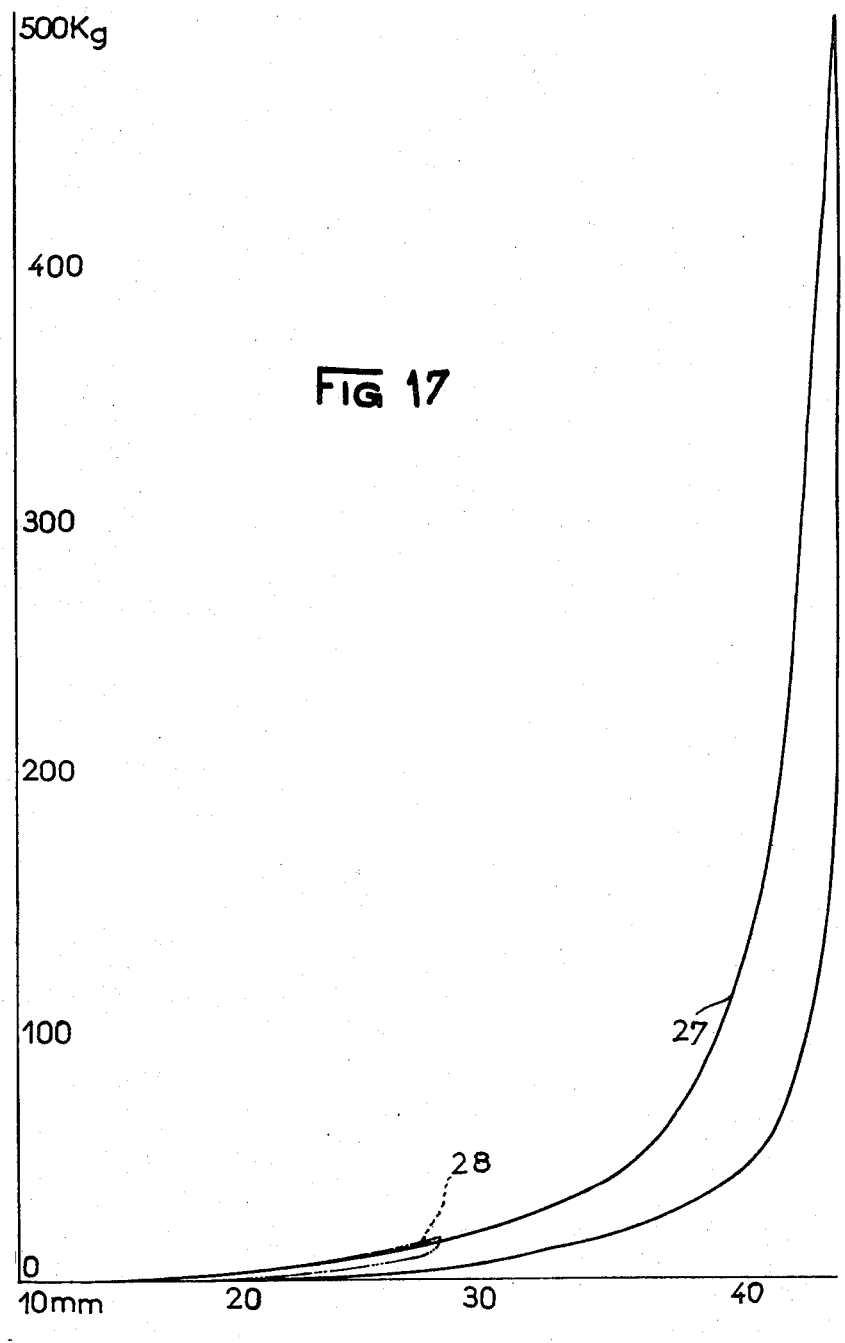

United States Patent Office 3,161,407
Patented Dec. 15, 1964

3,161,407
VIBRATION AND SHOCK ABSORBER
Leo Victor Robin, Ville D'Avray, France, assignor to Vibrachoc, Paris, France, a corporation of France
Filed July 11, 1962, Ser. No. 209,167
Claims priority, application France, Dec. 13, 1961, 881,837
12 Claims. (Cl. 267—1)

The present invention is concerned with vibration and shock absorbers.

This invention consists in embedding or wrapping the wire or strip constituting the convolutions of a coil spring in a sheath of resiliently deformable material, said sheath isolating the convolutions from one another.

According to another feature of this invention, the sheath consists of knitted metal wire fabric, natural or synthetic rubber, silicone, or any other material adapted to undergo an elastic deformation.

According to a further feature characterizing this invention, the aforesaid sheath is formed with splines, corrugations or like relief patterns on at least one of its faces.

It is a complementary feature of this invention to set the depth and pitch of said splines, corrugations or like relief patterns as a function of the desired shock absorber characteristics.

As an additional feature of the invention, the aforesaid splines, corrugations or like relief patterns are directed preferably obliquely in relation to the spring convolutions.

Furthermore, this invention is characterized in that the aforesaid sheath has such dimensions that the edges enclosed in the spring constitute by their superposition a resiliently deformable pad.

Other features and advantages of the invention will appear as the following description proceeds with reference to the accompanying drawings, in which:

FIGURES 1, 2 and 3 are diagrammatic sections illustrating three different forms of embodiment of a shock absorber constructed in accordance with the invention;

FIGURE 4 is an axial section showing an alternate embodiment of a shock absorber according to this invention which comprises a coil spring consisting of a helically wound strip;

FIGURES 5 and 6 are fragmentary sections showing the wire or convolution of a spring embedded in a single sheath and in a double sheath, of knitted fabric resepctively;

FIGURES 7 and 8 show in the unfolded and folded conditions respectively a strip of knitted fabric adapted to cover the spring wire or strip;

FIGURE 17 is a diagram illustrating the compression and expansion curves obtained with a shock absorber of known type consisting of a spring enclosing a resilient damping pad, and with a shock absorber according to this invention, respectively.

FIGURES 1, 2, 3 and 4 illustrate different forms of embodiment of the shock absorber of this invention.

Figure 9:
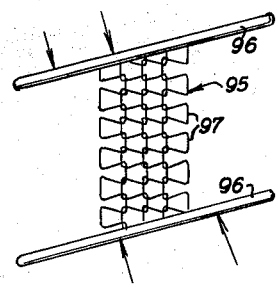
FIGURE 9 shows in diagrammatic view and on a larger scale two consecutive convolutions of a known shock absorber consisting of a spring surrounding a damping pad.

The vibration and shock absorber of FIGURE 1 comprises a helical spring 6 of cylindrical general configuration, the convolutions of which are embedded in or surrounded by a continuous sheath 16 isolating any convolution from the adjacent one. The spring head or top is enclosed in a cap or inverted cup 17 of substantially frusto-conical configuration which is secured on an upper plate or like support 4 and has relatively substantial dimensions, the lower end of the spring fitting in a dish-like cup 18 secured on a lower plate 3.

Figure 11:
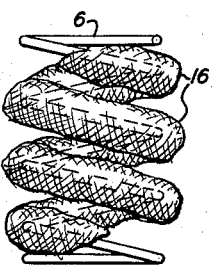
FIGURE 11 is an elevation view partly broken away of the spring and sheath of FIGURE 1 in extended condition.

As shown more particularly in FIGURE 11 (which relates to a coil spring similar to the spring of FIGURE 1, shown in extended condition), the sheath 16 of the shock absorber of FIGURE 1 consists of a strip of wire mesh structure, for example of the knitted fabric type. The sheath 16 consists of a fabric strip or band provided with corrugations extending obliquely with respect to its longitudinal edges. These corrugations may be obtained, for instance, by causing said strip to pass between two helical gears so as to be inclined from 30° or 45° with respect to the strip general direction (see FIGURE 7). The corrugated strip of FIGURE 7 is subsequently folded to a V shape whereby the corrugations 20, 20' of the two arms of the V cross each other (see FIGURE 8). The strip thus folded is placed on the spring wire 6 to embed the latter (FIGURE 5). The edges of the the folded strip are located in the inside of the coil spring 6. Said strip is thus formed in a continuous helical sheath 16 surrounding the individual convolutions of the spring wire which are consequently separated one from the other by two thicknesses of sheath (see FIGURES 1 and 11). Furthermore, with such an arrangement, the corrugations provided on two adjacent convolutions of the sheath, are crossing each other (see FIGURE 11) and the portions of the sheath located in the inside of the coil spring constitute a resiliently deformable pad.

As shown diagrammatically in FIGURE 9, shock absorbers are already known which comprise a coil spring 96 surrounding a damping pad 97 made of a roll of knitted corrugated fabric entirely located in the inside of said coil spring. In FIGURE 9 have been shown the stitches 95 of the knitted fabric which are generally stressed to deform without any consideration for the longitudinal corrugations (not shown). During the compression of this known shock absorber the shape of these corrugations remains practically unaltered.

Figure 10:
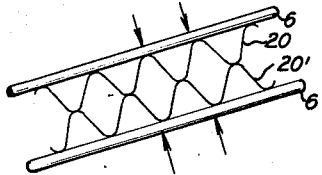
FIGURE 10 is a view substantially similar to FIGURE 9 showing the diagrammatic structure of a shock absorber according to this invention.

On the contrary, in the case of a shock absorber according to the invention, as shown in FIGURES 1 and 11 and also in FIGURE 10 (which shows very diagrammatically the coaction of corrugations 20 and 20' of registering portions of the sheath 16 when compressed by adjacent convolutions of the coil spring 6), it is evident that the compression load stress applied to the spring 6 firstly tends to flatten the corrugations 20, 20' the deformation of their stitches occuring only in the case of considerably greater stress.

In the example illustrated in FIGURE 2, a vibration and shock absorber according to the invention comprises a helical spring 26 of tapered general configuration, embedded in a sheath 21 of the same type as the sheath 16 of FIGURES 1, 7, 8, 10 and 11. The spring 26 with its relevant sheath 21 is located between a cap 22 solid with an upper plate 24 and a dish-like element 29 secured on a lower plate 23.

In the example of FIGURE 3, there is shown in cross section a spring 36 of accordion general configuration, the convolutions of which are located substantially in the same plane. The extreme convolutions of spring 36 are secured by known means such as bolts to a lower plate 33 and an upper plate 34 respectively. A sheath 37 is provided about the spring 36 which, in the present case, is made of a flat strip of resilient material of substantially rectangular cross section. This sheath 37 is secured by its ends to the spring 36 and to the plate 33 and 34 respectively by means of bolts.

The wire constituting the convolutions of FIGURES 1 and 2 is not necessarily of circular cross section and may be of elongated cross section as shown in FIGURE 4. The shock absorber of this FIGURE 4 is analogous to the one of FIGURE 1 and comprises a wire 46 embedded in a sheath 47, said wire being of substantially rectangular cross section. It has to be noted, in fact, that the cross section of the wire or strip constituting the spring is a very important factor. In the case of coil springs having the same moment of torsion, the load capacity and the shock absorbing efficiency increase with the width $a$ of the cross section (see FIGURE 4). This is due notably to the fact that when the spring is compressed a greater number of stitches are directly "pinched" between two consecutive convolutions.

It is evident that the characteristics of the shock absorber can be modified by varying the depth and/or pitch of the corrugations. Of course, it is also possible to vary the characteristics of the shock absorber by superposing a plurality of layers of knitted fabric, or by utilizing knitted fabrics consisting of one, two, three, four or more wires having different characteristics and/or cross sections, if desired. FIGURE 5 shows in cross sectional view the spring wire 6 of the shock absorber of FIGURE 1, which wire is embedded in the single sheath 16 whereas FIGURE 6 shows a wire 66 similar to the wire 6 of FIGURE 1, said wire being embedded in two superimposed sheaths 67 and 68.

It has to be noted that the details of the coil spring wire and sheath located beyond the sectional plane have been omitted in these FIGURES 5 and 6 for purpose of clarity.

FIGURES 12, 13, 14 and 15 illustrate diagrammatically perspective and sectional views of different forms of sheaths according to other embodiments of shock absorbers of this invention. Such sheaths may be mounted about the wire of springs such as those of FIGURES 1, 2, 3 and 4.

Figure 12:
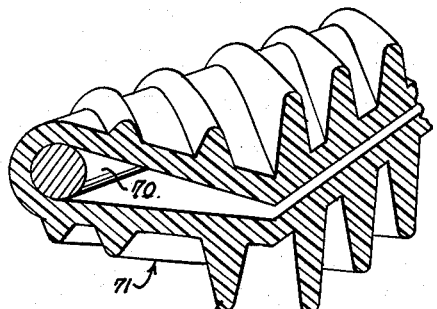
FIGURES 12 and 13 show diagrammatic perspective sectional views of two alternate embodiments of the invention wherein the sheath forming strip consists of elastically deformable material, which is fluted or formed with splines or corrugations on its outer surface (FIGURE 12) and on its outer and inner surfaces (FIGURE 13) respectively.

In FIGURE 12, the wire 70 of a spring is embedded in a sheath 71 consisting of a strip of elastically deformable material such as rubber, silicone, etc. This strip of substantially closed V cross-section is formed with oblique external splines of corrugations 72.

Figure 13:
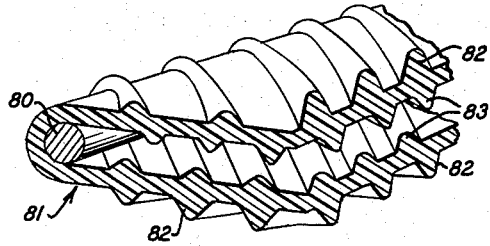

In FIGURE 13, the wire 80 of a spring is embedded in a sheath 81 consisting of a strip of the same type as strip 71 of FIGURE 12. This strip 81 comprises splines or corrugations 82 on its outer surface as well as corrugations 83 formed in its inner surface.

Figure 14:
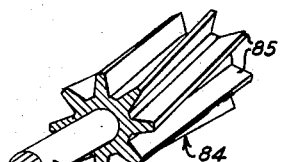
FIGURES 14 and 15 are diagrammatic perspective and sectional views respectively showing alternate embodiments wherein the spring wire is embedded in a cylindrical sheath.
Figure 15:
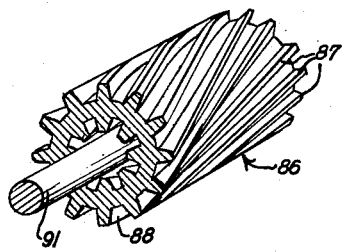

In the examples illustrated in FIGURES 14 and 15 the strip constituting the sheath of the preceding examples is replaced by a tubular sheath of resiliently deformable material. In the example of FIGURE 14, there is shown a tube 84 of resiliently deformable material embedding a wire 90. The tube 84 comprises external corrugations or splines 85 extending helically on its outer surface. It is easy to understand that the wire 6 of FIGURE 1, 26 of FIGURE 2, 36 of FIGURE 3, 46 of FIGURE 4, being coated with such a tube 84 provided with external corrugations or splines 85, these latter will coact one with the others as explained hereinabove, with reference to FIGURES 1 and 11.

In FIGURE 15, a wire 91 has been shown coated by a tube 86 made of resilient material comprising outer corrugations 87 similar to the corrugations 85 of the tube 84 of FIGURE 14. This tube 87 is also provided with inner corrugations or splines 88, the outer and inner corrugations 87 and 88 being so directed (with opposite pitches) as to cross each other as shown in the drawing of FIGURE 15.

Figure 16:
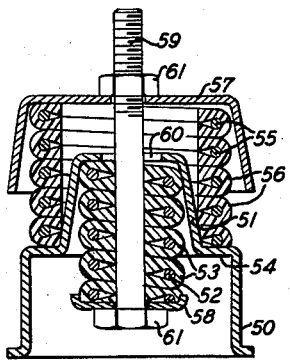
FIGURE 16 is an axial section showing a multi-directional shock absorber constructed according to the invention.

FIG. 16 illustrates a typical embodiment of a multi-directional shock absorber according to this invention.

This shock absorber comprises a hollow, substantially cylindrical lower collar or support 50 closed at the top by a cap 51 preferably of frusto-conical configuration which surrounds the head or top of a spring 52 having its convolutions embedded in a sheath 53 of the type described in the preceding examples; an inner shoulder 54 is formed between the cap 51 and collar 50 for supporting the lower end of a spring 55 also surrounded by a sheath 56 and fitting around the cap 51. Other cap members 57 and 58 surround respectively the head of spring 55 and the base of spring 52; these cap members 57 and 58 are interconnected by a rod 59 extending substantially along the common axis of the concentric springs 52 and 55 and through an orifice 60 formed centrally of the cap 51 and of greater diameter than said rod. The length of rod 59 is adjustable for example by means of nuts or like elements 61.

Preferably, the side walls of cap 57 are tapered to limit the transverse oscillation of the shock absorber due to the frictional engagement set up between the resilient pad surrounding the spring 55 and the cap walls. It will be noted that the shock absorber just described is capable of damping out vibration and to absorb shocks exerted in any direction, due to the combined action of the two dampening springs operating in opposite directions and also capable of moving transversely by a distance corresponding to the play of rod 59 in orifice 60.

Thus, with this invention a shock absorber having the desired natural response frequency is obtained, with very high shock absorbing properties.

Whereas in known shock absorbers the oscillation amplitude at the resonance frequency may attain 3 to 4 times the exciting amplitude, with the shock absorber according to this invention an oscillation amplitude attaining only 1.2 to 2 times the exciting amplitude is obtained at the resonance frequency.

There is illustrated by way of example in the diagram of FIG. 17, in thick lines the curve 27 concerning the compression and expansion of a shock absorber constructed according to the invention and in chain-dotted lines the curve 28 of a conventional-type shock absorber.

In the example illustrated, two identical compression springs are used, and the knitted fabric is also the same in either case (1/64" cold-drawn steel wire). The conventional shock absorber had the maximum permissible quantity of knitted fabric, and the improved shock absorber of this invention had three times this quantity and the wire was embedded in two layers of knitted fabric; the tests were led until a permanent deformation appeared.

The following results have been obtained:

*Conventional construction.*—The maximum load capacity is 18 kilograms with a 28-millimeter deflection, the natural frequency under this load being 8 Hz.

*Construction according to this invention.*—The maximum load capacity is 500 kilograms with a 42-millimeter deflection to yield an 8-Hz. natural frequency; an 80-kilogram load may be contemplated.

Moreover, it will be readily understood that the loss by internal frictional contact is considerably higher in this novel construction.

Therefore, the damping action is considerably greater.

Of course, the characteristics of the stock absorber may be changed to a great extent by varying the characteristics of the sheath, of the corrugations, by using different fabric thicknesses, etc.

Finally, the invention should not be construed as being limited to the specific forms of embodiment shown and described herein, which are given by way of example only.

What I claim is:

1. A vibration and shock absorber comprising a resiliently deformable convolution-forming wire, a continuous sheath made of resiliently deformable material embedding the individual convolutions of said wire and isolating convolutions from one another, said sheath comprising at least on its outer surface corrugations directed obliquely with respect to the convolution-forming wire.

2. A vibration and shock absorber as claimed in claim 1 wherein said sheath consists of a tubular element made of resiliently deformable material and formed on at least its outer surface with splines constituting said corrugations.

3. Shock absorber as claimed in claim 1, wherein the angle formed between said corrugations with said wire is comprised between 30° and 45°.

4. Shock absorber as claimed in claim 1, wherein said corrugations formed on the outer surfaces of opposite sides of each convolution have opposite directions.

5. A vibration and shock absorber comprising a coil spring and a sheath consisting of a resiliently deformable strip having substantially parallel longitudinal edges, said strip comprising at least on its outer surface corrugations directed obliquely with respect to said longitudinal edges and being folded along its longitudinal axis about said wire with said longitudinal edges lying inside said coil spring whereby said sheath extends internally of said coil spring to constitute therein a resiliently deformable damping pad.

6. A vibration and shock absorber comprising a resiliently deformable convolution-forming wire, a continuous sheath made of resiliently deformable material embedding the individual convolutions of said wire and isolating adjacent convolutions from one another, said sheath comprising on its outer and inner surfaces respectively corrugations extending obliquely with respect to said convolution-forming wire, said corrugations provided on the outer surface of said sheath extending in a direction which crosses the direction along which extend said corrugations provided on the inner surface of said sheath.

7. Shock absorber as claimed in claim 6, wherein said sheath consists of a plurality of layers of said fabric.

8. A vibration and shock absorber comprising a resiliently deformable convolution-forming wire, a continuous sheath consisting of a fabric made of knitted metal wire embedding the individual convolutions of said wire and isolating adjacent convolutions from one another, said fabric being corrugated obliquely with respect to said convolution-forming wire.

9. A vibration and shock absorber comprising two coil springs including respective convoluted wire, sheaths having respective wire embedded therein, said sheaths each including outer corrugations directed obliquely with respect to the associated wire, said sheaths being constituted of elastic, deformable material and isolating the convolutions of respective wires from one another, and means supporting the coil springs in coaxial relation with one coil spring extending above the other of the coil springs whereby said one spring is an upper spring and the said other spring is a lower spring, said means including a common axial rod, an upper support engaging said upper spring at the upper end thereof, a lower support engaging the lower spring at the lower end thereof, an intermediate support between the upper spring at the lower end thereof and the lower spring at the upper end thereof, and means connecting the rod to the upper and lower supports, said intermediate support having an opening through which said rod projects with clearance.

10. A vibration and shock absorber as claimed in claim 9, wherein said upper support includes a frusto-conical skirt surrounding the upper spring along a relatively long fraction of its length.

11. A vibration and shock absorber as claimed in claim 9, wherein said upper spring including its sheath has an inner diameter greater, at its lower end, than the outer diameter of said lower spring, said intermediate support comprising a portion of frusto-conical configuration extending axially within the upper spring and receiving therein the upper end of the lower spring.

12. A vibration and shock absorber as claimed in claim 9, wherein said rod interconnecting said upper and lower supports is adjustable in the longitudinal direction.

References Cited by the Examiner

UNITED STATES PATENTS

| | | | |
|---|---|---|---|
| 84,258 | 11/68 | Russell | 267—33 |
| 2,247,543 | 7/41 | Bernstein | 267—1 X |

FOREIGN PATENTS

| | | |
|---|---|---|
| 1,082,870 | 6/24 | France. |
| 1,212,305 | 10/59 | France. |
| 497,008 | 12/38 | Great Britain. |
| 577,282 | 5/58 | Italy. |

ARTHUR L. LA POINT, *Primary Examiner.*

ROBERT C. RIORDON, *Examiner.*